(12) United States Patent
Silva

(10) Patent No.: US 12,471,613 B2
(45) Date of Patent: Nov. 18, 2025

(54) AÇAI-BASED FOOD COMPOSITION AND METHOD OF PREPARATION OF AÇAI-BASED FOOD COMPOSITION

(71) Applicant: Haroldo Souza Silva, Belem (BR)

(72) Inventor: Haroldo Souza Silva, Belem (BR)

(*) Notice: Subject to any disclaimer, the term of this patent is extended or adjusted under 35 U.S.C. 154(b) by 743 days.

(21) Appl. No.: 17/413,733

(22) PCT Filed: Dec. 13, 2018

(86) PCT No.: PCT/BR2018/050458
§ 371 (c)(1),
(2) Date: Jun. 14, 2021

(87) PCT Pub. No.: WO2020/118388
PCT Pub. Date: Jun. 18, 2020

(65) Prior Publication Data
US 2022/0046967 A1    Feb. 17, 2022

(51) Int. Cl.
*A23L 27/60*    (2016.01)
*A23L 19/00*    (2016.01)
*A23L 23/00*    (2016.01)

(52) U.S. Cl.
CPC ............... *A23L 27/60* (2016.08); *A23L 19/09* (2016.08); *A23L 23/00* (2016.08)

(58) Field of Classification Search
CPC .. A23L 27/60; A23L 23/00–10; A23L 29/015; A23L 29/212; A23L 29/30; A23L 27/63; A23L 19/09; A23L 27/00; C12J 1/00; A23V 2300/24
See application file for complete search history.

(56) References Cited

U.S. PATENT DOCUMENTS

| | | | | |
|---|---|---|---|---|
| 5,356,653 | A * | 10/1994 | Lathrop | A23L 21/12 426/573 |
| 6,284,303 | B1 | 9/2001 | Rowe et al. | |
| 2004/0208975 | A1* | 10/2004 | Kuhns | A23L 21/15 426/589 |
| 2004/0208976 | A1* | 10/2004 | Kuhns | A23L 29/269 426/589 |

(Continued)

FOREIGN PATENT DOCUMENTS

| | | |
|---|---|---|
| BR | 102015005810-1 A2 | 5/2018 |
| BR | 102016023087-0 A2 | 7/2018 |

(Continued)

OTHER PUBLICATIONS

Sambazon NPL, https://sambazon.blogspot.com/2011/05/bbq-acai-tempeh-burger.html (Year: 2011).*

(Continued)

*Primary Examiner* — Drew E Becker
(74) *Attorney, Agent, or Firm* — The Dobrusin Law Firm, P.C.

(57) ABSTRACT

The present invention refers to açai-based food composition comprising: açai pulp, vinegar, "dedo-de-moça" chili pepper, one or more flavor adding ingredients chosen from onion, garlic, tomato or their mixtures; thickening agents chosen from starch, corn sugar or mixtures thereof; salt and sugar. The present invention further relates to a method of preparation the açai-based food composition.

12 Claims, 1 Drawing Sheet

(56) References Cited

U.S. PATENT DOCUMENTS

| | | | |
|---|---|---|---|
| 2007/0196555 A1* | 8/2007 | Young | A23L 23/10 426/589 |
| 2008/0268108 A1* | 10/2008 | Palaniappan | A23B 7/154 426/131 |
| 2010/0092648 A1* | 4/2010 | Fischer | A23L 27/10 426/589 |
| 2011/0008501 A1* | 1/2011 | Enfield | A23L 27/10 426/589 |
| 2014/0342048 A1* | 11/2014 | Chang | A61K 31/439 426/589 |
| 2015/0056359 A1* | 2/2015 | Jensen | A23L 19/09 426/589 |
| 2015/0230513 A1* | 8/2015 | Stone | A23L 19/09 426/89 |
| 2023/0232879 A1* | 7/2023 | Martinez Mur | A23L 19/09 426/602 |

FOREIGN PATENT DOCUMENTS

| | | |
|---|---|---|
| JP | S5571473 A | 5/1980 |
| JP | H01281056 A | 11/1989 |
| JP | H0216948 A | 1/1990 |
| WO | 2005/011408 A1 | 2/2005 |
| WO | 2007/092383 A2 | 8/2007 |
| WO | 2014/033761 A1 | 3/2014 |
| WO | 2015175449 A1 | 11/2015 |

OTHER PUBLICATIONS

Apply Jelly NPL, https://revistacasaejardim.globo.com/Casa-e-Comida/Receitas/Acompanhamentos/noticia/2016/03/geleia-agridoce-de-maca-com-dedo-de-moca.html (Year: 2016).*
Translation of BR 102019023177A2 (Year: 2021).*
Translation of BR 102020021581A2 (Year: 2022).*

* cited by examiner

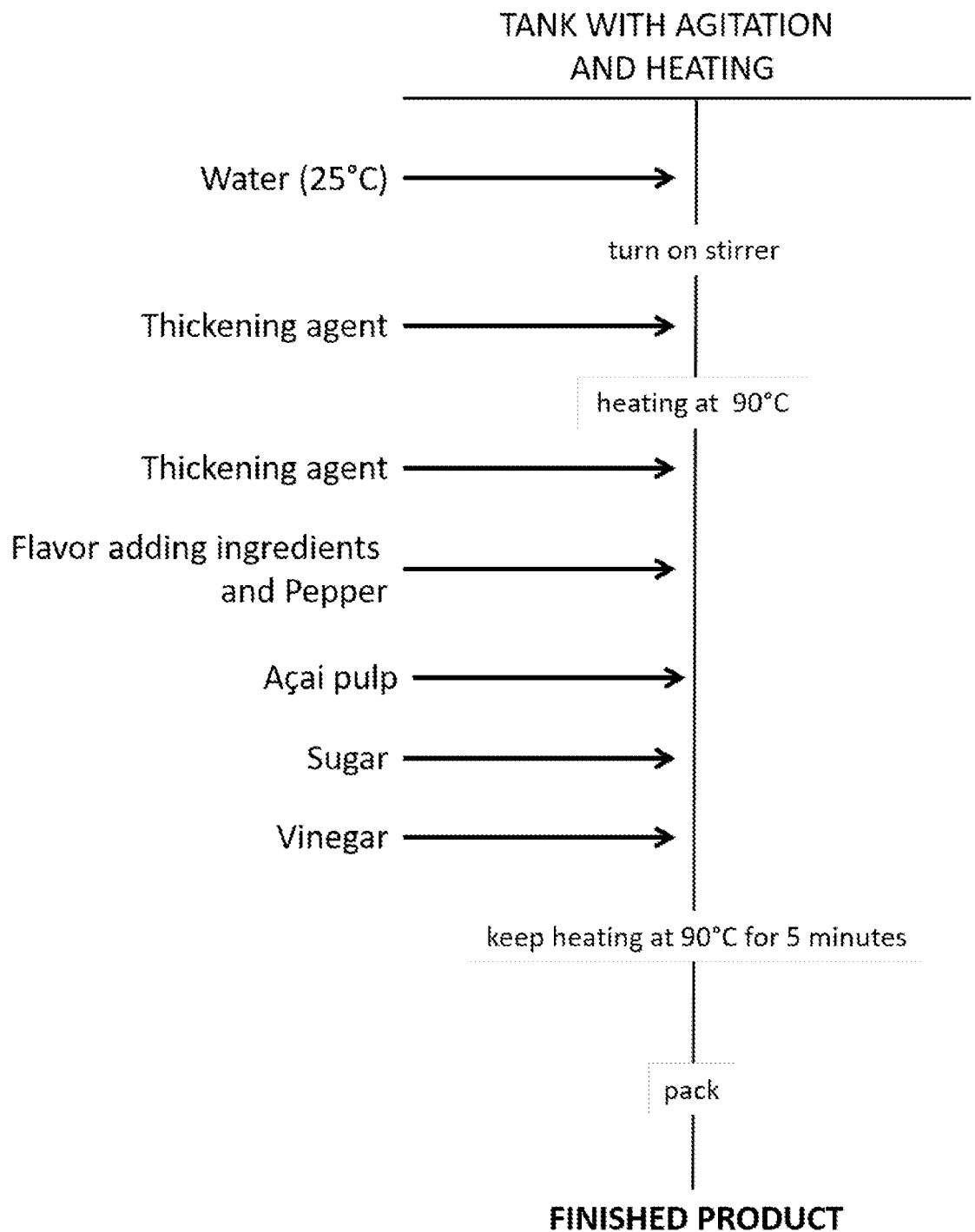

AÇAI-BASED FOOD COMPOSITION AND METHOD OF PREPARATION OF AÇAI-BASED FOOD COMPOSITION

FIELD OF APPLICATION

The present invention refers to processed food, with creamy texture, easily removable from the package and easy to apply on the surface of food in general. The color varies from brown to wine, with a characteristic dour and flavor of açai and spices such as "dedo-de-moça" chili pepper, vinegar, and others, which can be used as a sauce and replace ketchup, mayonnaise, mustard, etc.

PRIOR ART

Empirically, açai or açai paste or açai wine is used in food by populations in Northern Brazil, mainly in the states of Amazonia and Pará. By hand, the açai fruit is removed from the bunches of the palm tree, softened in warm water and passed through a sieve, producing the açai wine that is used for direct consumption, or added to cassava flour ("pirão") or consumed together with fish and/or other foods.

Considered as a food of high nutritional value, açai has become popular throughout Brazil and abroad it is consumed as "açai na tigela" (açai in the bowl)—with a sweet flavor with fruit or as juice or sweetened ice cream. This açai is always frozen and packed in 1 kg net weight plastic bags. The handling of frozen blocks of açai is tiring, making its preparation and application difficult.

In order to further popularize the consumption of açai in its salted form, the concept of processed, salty, açai-based food was developed, which is stable at room temperature, and which can advantageously replace ketchup sauces, mayonnaise, mustard, etc. The product packaged in a sachet or plastic bottle is convenient, easy to use and contains all the benefits of açai.

Other preparations that can be used as sauces and/or substitutes for ketchup, mayonnaise, mustard etc. are described in patent documents WO2007092383, WO2014033761, JPH0216948, JPS5571473, JPH01281056, WO2015175449, WO2005011408, U.S. Pat. No. 6,284,303, BR102016023087-0 and BR102015005810-1.

WO2007092383 discloses a mayonnaise-like product containing water, corn syrup, vinegar, cellulose gel, whey protein, xanthan gum, potassium citrate, starch, halibut liver oil and olive oil.

WO2014033761 discloses a sauce similar to ketchup made on the basis of balsamic vinegar and tomato.

On the other hand, JPH0216948, JPS5571473, JPH01281056 describe ketchup preparations using citrus fruits, mandarin and carrot, respectively.

WO2015175449 discloses a cheese sauce containing vegetables such as carrots and parsnips.

WO2005011408, U.S. Pat. No. 6,284,303, BR102016023087-0 describe sauces based on garlic, pumpkin and beetroot, respectively.

Finally, BR102015005810-1 describes a sauce with a high content of flavonoids containing *Camelia sinensis* extract, mate extract, red cabbage, tomato, strawberry, among other ingredients.

As can be seen from the patent documents presented above, none of them disclose a food product with creamy texture, salty and based on açai.

The purpose of the present invention is to develop a new way of consuming açai and its benefits, along with salty foods such as meat, fish, eggs, vegetables, bread, etc., thus bringing practicality of use and the characteristic flavor.

As advantages of the present invention, it is possible to mention: innovation in the form of consumption of açai as a salty product applied in açai sauce; innovation in the form of presentation in a controlled portion such as a sachet; innovation in the blend of açai, vinegar and pepper flavors; availability of stable product at room temperature that does not require refrigeration or freezing.

BRIEF DESCRIPTION OF THE INVENTION

The present invention refers to a açai-based food composition comprising: açai pulp; vinegar; "dedo-de-moça" chili pepper; one or more flavor adding ingredients chosen from onion, garlic, tomato or mixtures thereof; one or more thickening agents chosen from starch, corn sugar or mixtures thereof; salt and sugar.

The present invention further refers to a method of preparation açai-based food composition, said method comprising the following steps:
 a. adding water to a tank, followed by starting tank agitation;
 b. adding one or more thickening agents to the tank containing water;
 c. heating the mixture obtained in the step (b);
 d. adding one or more flavor adding ingredients, and pepper;
 e. adding açai pulp;
 f. adding sugar;
 g. adding vinegar;
 h. heating the composition obtained in the step (g);
 i. cooling of the composition obtained in the step (h).

DETAILED DESCRIPTION OF THE INVENTION

The present invention refers to an açai-based food composition comprising:
 açai pulp;
 vinegar;
 "dedo-de-moça" chili pepper;
 one or more flavor adding ingredients chosen from onion, garlic, tomato or their mixtures;
 one or more thickening agents chosen from starch, corn sugar or mixtures thereof;
 salt; and
 sugar.

The açai pulp is the product extracted from the edible part of the fruit of the açai tree (*Euterpe oleraceae* Mart.), being also known as "açai wine". The "açai wine" refers to the expression used by the populations of the Amazon region and Para state to characterize the açai pulp obtained by maceration of the açai fruit, in continuous washing with warm water. This rudimentary processing can be done manually or, more recently, with the help of cylindrical mixers fitted with robust stirrers that, with the continuous aid of washing water, remove the pulp from the surface of the fruits, thus forming the "açai wine" or açai pulp.

Depending on the amount of water added, the "açai wine" or açai pulp can be classified into:
 Thick or special açai (type A): it is the pulp added with water and filtered, presenting above 14% of total soluble solids and a very dense appearance;
 Medium or regular açai (type B): it is the pulp added with water and filtered, presenting between 11% and 14% of total solids and a dense appearance;

Thin or popular açai (type C): it is the pulp added with water and filtered, presenting 8% to 11% of total solids and a less dense appearance.

The açai pulp or "açai wine" used in the present invention can be chosen between thick, medium or fine açai; being the medium açai used in a preferential way.

The açai-based food composition, according to the present invention, comprises açai pulp in a concentration above 50% by weight, preferably between 51% to 70% by weight. Preferably, the composition comprises 51% by weight of açai pulp.

The present composition comprises fruity vinegar, chosen from apple, grape, pineapple, guava or mixtures thereof. Preferably, apple cider vinegar is used.

The concentration of vinegar in the food composition varies between 5% to 10% by weight, preferably 8% by weight.

The "dedo-de-moça" chili pepper (*Capsicum baccatum* species) is present in the food composition at levels below 0.5% by weight, especially in the range that varies between 0.5% to 0.01% by weight. Preferably, the açai-based food composition of the present invention comprises 0.3% by weight of "dedo-de-moça" chili pepper.

According to the invention, the flavor adding ingredients are vegetables that add aromatic diversity, are nutritious and when added with sweet and salty notes, along with the acidity of the vinegar make the flavor of açai stand out. The flavor adding ingredients can be chosen from onion, garlic, tomato or their mixtures and can be used in dehydrated or concentrated form. The flavor adding ingredients are present in a concentration ranging from 1% to 30% by weight.

Preferably, the açai-based food composition comprises tomato puree or concentrate in a concentration of 13% by weight; onion at a concentration of 1% by weight and garlic at a concentration of 1% by weight.

The thickening agents present in the composition can be chosen from starch, corn sugar or their mixtures, and the starch can be chosen from cassava starch, wheat, corn or their mixtures. Preferably, the açai-based food composition comprises cassava starch.

According to the invention, starch is used in a concentration ranging from 0.5% to 4% by weight, preferably 2% by weight; while corn syrup is present in a concentration ranging from 2% to 7% by weight, preferably 4% by weight.

The salt is present in a concentration ranging from 0.01% to 5% by weight, preferably 1% by weight. Sugar is present in a concentration ranging from 5% to 15% by weight, preferably 11% by weight.

Optionally, the açai-based food composition also comprises other ingredients, such as banana, strawberry, paprika, carrot, peach palm (pupunha palm heart), or their mixtures.

The present invention also refers to a method for preparing açai-based food composition, wherein said method comprises the following steps:
a. adding water to a tank, followed by starting tank agitation;
b. adding one or more thickening agents to the tank containing water;
c. heating the mixture obtained in the step (b);
d. adding one or more flavor adding ingredients and pepper;
e. adding açai pulp;
f. adding sugar;
g. adding vinegar;
h. heating the composition obtained in the step (g);
i. cooling of the composition obtained in the step (h).

According to the method described here, the heating of steps (c) and (h) occurs at 90° C., and in step (h) the composition is kept heated for 5 minutes.

Once the composition described above is cooled, a salty food composition is obtained, with a creamy texture, stable at room temperature and which can be made available to the consumer in individual sachets or plastic bottles.

FIG. 1 illustrates the flowchart of the method of preparation of the food composition, according to steps (a) to (i) specified above.

Example

The following is an example of the açai-based food composition of the present invention, which are intended only to illustrate a configuration of the present invention, and the example given is only illustrative and not limiting.

| Ingredient | Concentration (%) |
| --- | --- |
| Tomato puree/concentrate | 13 |
| Medium Acai | 51 |
| Apple cider vinegar | 8 |
| Salt | 1 |
| Onion | 8 |
| Corn syrup | 4 |
| Starch | 2 |
| Sugar | 11 |
| Garlic | 0.5 |
| Pepper | 0.3 |
| Water | 8.2 |

The invention claimed is:

1. An açai-based food composition, stable at room temperature, consisting of
   i) an açai Pulp in a concentration between 51% and 70% by weight;
   ii) a vinegar in a concentration between 5% to 10% by weight;
   iii) a "dedo-de-moça" chili pepper (*Capsicum baccatum* species) in a concentration between 0.01% to 0.5% by weight;
   iv) one or more flavor adding ingredients chosen from an onion, in a concentration of 1%, a garlic in a concentration of 1%, a tomato puree or concentrate in a concentration of 13%;
   v) one or more thickening agents chosen from starch in a concentration between 0.5 to 4%, corn sugar in a concentration between 2% to 7% by weight or mixtures thereof;
   vi) a salt in a concentration between 0.01% to 5% by weight; and
   vii) a cane sugar in a concentration between 5% to 15% by weight.

2. The composition according to claim 1, wherein the açai pulp is of thick, medium, or fine type.

3. The composition according to claim 1, wherein the acai pulp is of medium type.

4. The composition according to claim 1, wherein the vinegar is of the fruity type, chosen from apple cider, grape, pineapple, guava or their mixtures.

5. The composition according to claim 1, wherein the vinegar concentration is 8% by weight.

6. The composition according to claim 1, wherein the "dedo-de-moça" chili pepper (*Capsicum baccatum* species) is present in a concentration of 0.3% by weight.

7. The composition according to claim 1, wherein the starch is chosen from cassava starch, wheat, corn or their mixtures.

8. The composition according to claim 1, wherein the starch is present in a concentration of 2% by weight.

9. The composition according to claim 1, wherein the corn sugar is present in a concentration of 4% by weight.

10. The composition according to claim 1, wherein the salt is present in a concentration of 1% by weight.

11. The composition according to claim 1, wherein the cane sugar is present in a concentration of 11% by weight.

12. The composition according to claim 10, wherein the açai pulp is 51% by weight.

* * * * *